United States Patent
Bordoloi et al.

(10) Patent No.: US 11,023,351 B2
(45) Date of Patent: Jun. 1, 2021

(54) SYSTEM AND METHOD OF SELECTING A COMPUTATIONAL PLATFORM

(71) Applicant: GM GLOBAL TECHNOLOGY OPERATIONS LLC, Detroit, MI (US)

(72) Inventors: Unmesh Dutta Bordoloi, Troy, MI (US); Paolo Giusto, Brentwood, CA (US); Soheil Samii, Royal Oak, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 1031 days.

(21) Appl. No.: 15/445,435

(22) Filed: Feb. 28, 2017

(65) Prior Publication Data

US 2018/0247223 A1 Aug. 30, 2018

(51) Int. Cl.
| | | |
|---|---|---|
| *G06F 11/34* | (2006.01) | |
| *G06N 20/00* | (2019.01) | |
| *G06N 5/02* | (2006.01) | |
| *G06N 7/00* | (2006.01) | |

(52) U.S. Cl.
CPC ...... *G06F 11/3447* (2013.01); *G06F 11/3409* (2013.01); *G06N 5/022* (2013.01); *G06N 7/005* (2013.01); *G06N 20/00* (2019.01)

(58) Field of Classification Search
CPC ........ G06N 7/005; G06N 20/00; G06N 20/10; G06N 20/20; G06N 5/022; G06F 11/3409; G06F 11/3447
See application file for complete search history.

(56) References Cited

U.S. PATENT DOCUMENTS

| | | | | |
|---|---|---|---|---|
| 5,615,357 | A | * | 3/1997 | Ball ................. G06F 11/3428 703/21 |
| 7,007,270 | B2 | | 2/2006 | Martin et al. |
| 2015/0042369 | A1 | * | 2/2015 | Chen ............... G01R 31/31718 324/750.3 |
| 2015/0371249 | A1 | * | 12/2015 | Izukura ............... G06Q 50/10 705/7.35 |
| 2018/0321980 | A1 | * | 11/2018 | Lo ....................... G06F 9/5038 |

FOREIGN PATENT DOCUMENTS

CN 105975385 A 9/2016

* cited by examiner

*Primary Examiner* — Shane D Woolwine
(74) *Attorney, Agent, or Firm* — Lorenz & Kopf, LLP

(57) ABSTRACT

Methods and apparatus are provided for selecting a computational platform. The method includes collecting platform feature data for each of a plurality of existing computational platforms in a particular class of computational platforms. The platform feature data for each of the plurality of existing computational platforms includes a plurality of design parameters and a performance measurement for the computational platform to complete a benchmarking software component. The method further includes training a mathematical model using the collected platform feature data to devise a predictive model for predicting a predicted performance measurement for a computational platform in the particular class of computational platforms when provided with design parameters, predicting, with the predictive model, the predicted performance measurement of a new computational platform that is not available for testing, and selecting a computational platform using the predicted performance measurement.

20 Claims, 9 Drawing Sheets

| SoC | Number of cores | Frequency | L2 Cache | Memory | ... | Execution Time |
|---|---|---|---|---|---|---|
| SoC 1 | 2 | 1GHz | 1MB | 2GB | ... | 30ms |
| SoC 2 | 4 | 600MHz | 512KB | 1GB | ... | 35ms |
| SoC 3 | 8 | 500MHz | 256KB | 1GB | ... | 25ms |
| ... | ... | ... | ... | ... | ... | ... |

Design Parameters (variables): e.g., collected from datasheets

Outcome: e.g., determined by running benchmark software or historical data

FIG. 6

| SoC | Number of Cores | Frequency | L2 cache | Memory | Execution Time |
|---|---|---|---|---|---|
| SoC 1 | 2 | 1GHz | 1MB | 2GB | 30ms |
| SoC 2 | 4 | 600MHz | 512KB | 1GB | 35ms |
| SoC 3 | 8 | 500MHz | 256KB | 1GB | 25ms |
| ... | ... | ... | ... | ... | ... |

Variable names   $X_1$   $X_2$   $X_3$   $X_4$   $y$

Hypothesis   $y = \theta_1 \cdot (X_1)^{\gamma_1} + \theta_2 \cdot (X_2)^{\gamma_2} + \ldots$

FIG. 7

| SoC | Number of Cores | Frequency | L2 Cache | Memory | Execution Time |
|---|---|---|---|---|---|
| SoC new | 16 | 500 MHz | 2 MB | 2GB | To be predicted |

FIG. 8

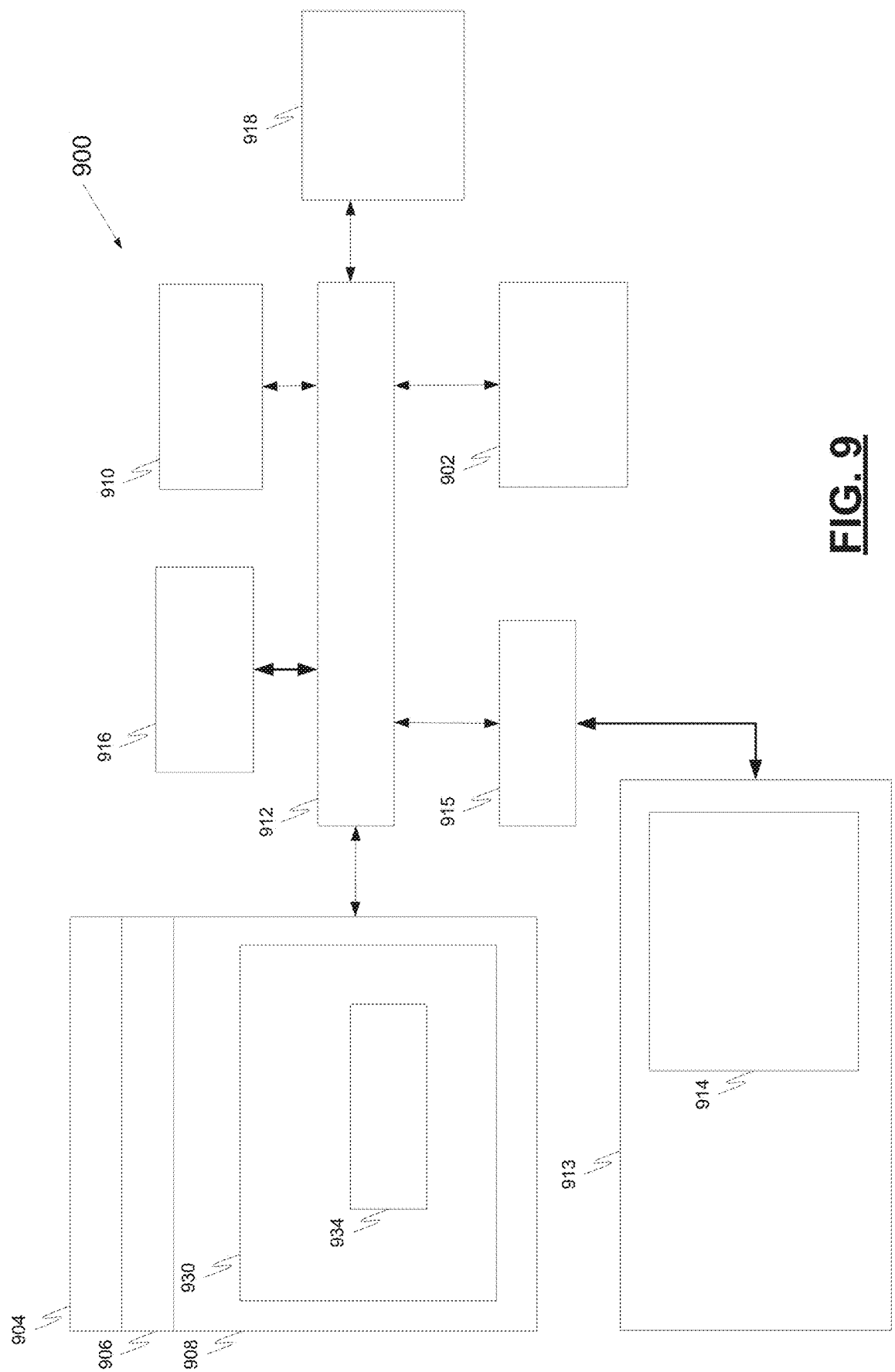

SYSTEM AND METHOD OF SELECTING A COMPUTATIONAL PLATFORM

TECHNICAL FIELD

The technology described in this patent document relates generally to computational platforms and more particularly to predicting the performance of computational platforms using preliminary design parameters.

BACKGROUND

Computational platforms such as central processing units (CPUs), microprocessor units (MPUs), and digital signal processors (DSPs) are used in numerous products. Product manufacturers have a wide selection of computational platforms to choose from for use in their products. For some product designs, computational platforms are chosen for use before the computational platforms have been reduced to physical form.

Accordingly, it is desirable to provide a system for predicting the performance of a computational platform and a system for selecting a computational platform based on the computational platform's predicted performance when a computational platform under consideration has not been reduced to a physical form. Furthermore, other desirable features and characteristics of the present invention will become apparent from the subsequent detailed description of the invention and the appended claims, taken in conjunction with the accompanying drawings and the background of the invention.

SUMMARY

A system for selecting a computational platform is provided. The system includes one or more processors and non-transient computer readable media. The non-transient computer readable media is encoded with programming instructions that when executed by the one or more processors cause the system to collect platform feature data for each of a plurality of existing computational platforms in a particular class of computing models. The platform feature data for each of the plurality of existing computational platforms includes a plurality of design parameters and a performance measurement for the computational platform when running a benchmarking software component. The non-transient computer readable media is further encoded with programming instructions that when executed by the one or more processors cause the system to train a mathematical model using the collected platform feature data to devise a predictive model for predicting a predicted performance measurement of a computational platform in the particular class of computing models when provided with design parameters that are customarily found on a platform provider datasheet and predict, with the predictive model, the predicted performance measurement of a new computational platform that is not available for testing.

A computer implemented method of selecting a computational platform is provided. The method includes collecting platform feature data for each of a plurality of existing computational platforms in a particular class of computational platforms. The platform feature data for each of the plurality of existing computational platforms includes a plurality of design parameters and a performance measurement for the computational platform to complete a benchmarking software component. The method further includes training a mathematical model using the collected platform feature data to devise a predictive model for predicting a predicted performance measurement of a computational platform in the particular class of computational platforms when provided with design parameters, predicting, with the predictive model, the predicted performance measurement for a new computational platform that is not available for testing, and selecting a computational platform using the predicted performance measurement.

BRIEF DESCRIPTION OF THE DRAWINGS

Aspects of the present disclosure are best understood from the following detailed description when read with the accompanying figures, wherein like numerals denote like elements.

FIG. 6 is a chart depicting example platform feature data that can be stored in a data record and used to train a prediction model using a process such as that depicted in FIG. 2, in accordance with some embodiments;

FIG. 7 is a chart depicting the use of the example platform feature data to train a prediction model using a process such as that depicted in FIGS. 3 and 4, in accordance with some embodiments;

FIG. 8 is a chart depicting example design parameters for a target platform that may be provided to a prediction model to predict the target platform's execution time using a process such as that illustrated in FIG. 5, in accordance with some embodiments; and FIG. 9 is a schematic block diagram of an example computer system that can be used to implement the techniques and methods described herein, in accordance with some embodiments.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

The subject matter described herein discloses apparatus, systems, techniques and articles, based on machine learning, for predicting the performance of a computational platform when running a software application. The described techniques allow for the prediction of a computational platform's performance without actually implementing and running any software on the computational platform. The predictions can be made before the computational platform is available in physical form. The described techniques allow for the prediction of a computational platform's performance without using a simulator that may need a detailed modeling of the computational platform. The described techniques can use abstract information (such as specific design parameters like frequency, cache, pipeline depth, etc.) regarding the computational platform. The described techniques may provide predictions that are sufficiently accurate even when not all the design parameters are known. Additionally, the prediction accuracy may be systematically improved by iteratively adjusting the prediction model.

Figure 1:
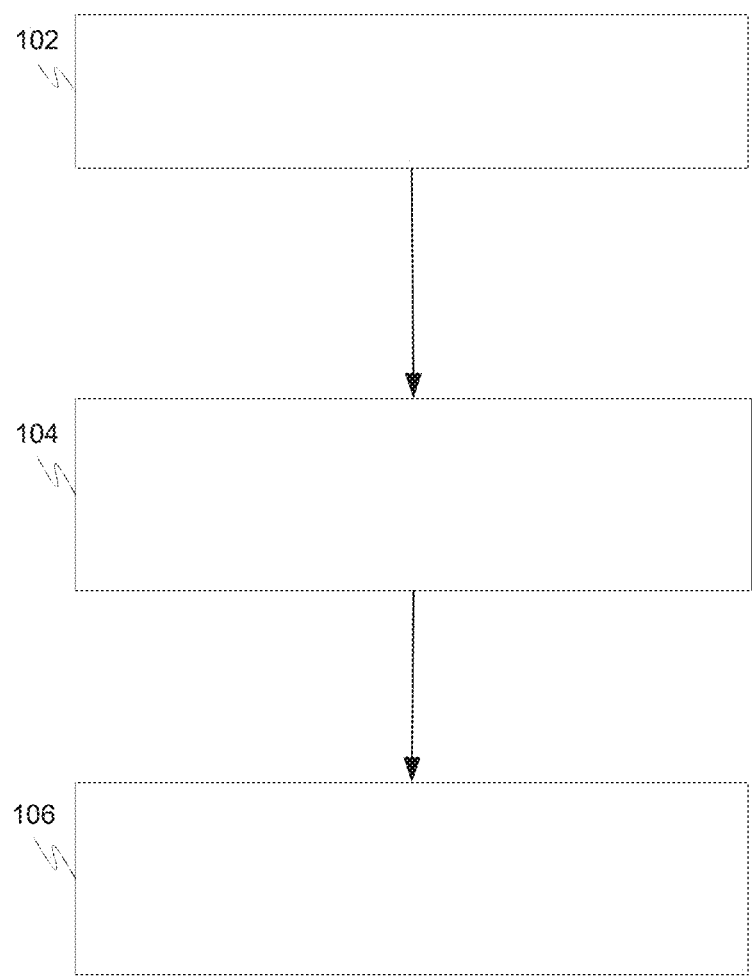
FIG. 1 is a process flow chart depicting an example computer-implemented process, based on machine learning, for predicting the performance of a computational platform when tasked to execute a specific software application, in accordance with some embodiments.

FIG. 1 is a process flow chart depicting an example computer-implemented process, based on machine learning, for predicting the performance of a computational platform when tasked to execute a specific software application. The predicted performance measurement in this example is predicted execution time. The example process can predict the execution time of test software on the computational platform without actually executing the software. The performance prediction can be used as a data point when selecting a computational platform for a product in development. This may allow for the selection of a computational platform for use in a new product design before the computational platform is available in physical form for software testing.

As used herein, a computational platform refers to a physical device that can perform computations such as a central processing unit (CPU), a microprocessor unit (MPU), a microcontroller unit (MCU), an application-specific instruction set processor (ASIP), a graphics processing unit (GPU), physics processing unit (PPU), a digital system processor (DSP), a reduced instruction set (RISC) processor, an image processor, a coprocessor, a floating-point unit, a network processor, a multi-core processor, a front-end processor, a field-programmable gate array (FPGA), a video processing unit, a vision processing unit, a tensor processing unit (TPU), a neural processing unit (NPU), a system on a chip (SOC), and others.

The example process depicted in FIG. 1 includes operations to collect platform feature data for a plurality of existing computational platforms (operation 102). The existing computational platforms refers to platforms that are in the same class of platforms as the computational platform whose performance the example process is designed to predict. As an example, if the example process were implemented to predict the performance of a new GPU under development, then the existing computational platforms would be a subset of the GPUs existing at the time of the performance of the example process. The plurality of existing computational platforms from which platform feature data is collected can be referred to as a training set of computational platforms.

Platform feature data, in this example, includes design parameters and benchmark data. Design parameters, in this example, refers to types of data typically used to describe the features of a computational platform. Examples of design parameters include operating frequency, the number of cores, the number of threads, number of caches, the size of the caches, the size of embedded memory, data bus size (e.g., 32-bit, 64 bit, etc.), address bus size, operating voltage, the fabrication process, external memories, and other performance related components connected to the computational platform.

Benchmark data, in this example, refers to data that describes the performance of the computational platform when executing specific benchmarking software. In particular, in this example, benchmark data refers to a performance measurement such as an execution-time performance measurement for the computational platform. In particular, the execution-time performance measurement, in this example, is the execution time required to complete the execution of the specific benchmarking software. In another example, the execution-time performance measurement may refer to the execution time of the computational platform to complete the execution of certain portions of specific benchmarking software. In other examples, benchmark data may refer to other types of performance measurements.

The example process depicted in FIG. 1 also includes operations to train and evaluate a mathematical model using the collected design parameters and benchmark data (operation 104). Training a mathematical model using the collected platform feature data is performed using machine learning techniques to devise a predictive model or algorithm for predicting an execution-time performance measurement for a computational platform based on the computational platform's design parameters. As an example, Waikato Environment for Knowledge Analysis (Weka), provides an open source suite of machine learning software written in Java. Weka software may be trained using the operations described herein to devise a predictive model or algorithm for predicting an execution-time performance measurement for a computational platform based on the computational platform's design parameters. In other examples, training a mathematical model using the collected platform feature data may be performed using machine learning techniques to devise a predictive model or algorithm for predicting one or more other performance measurement(s) for a computational platform based on the computational platform's design parameters.

Finally, the example process depicted in FIG. 1 includes operations to predict the performance of a new computational platform using the trained model (operation 106). Using the trained predictive model, a performance measurement such as an execution-time performance measurement of a new computational platform that is not in a physical form may be predicted. These operations allow for performance predictions of a computational platform without actually implementing and running any software on the computational platform.

After implementing the example process for predicting the performance of a computational platform (e.g., predicted execution-time performance measurement) an informed decision can be made when selecting a computational platform for a new product design. The prediction information can be used when selecting a computational platform that may not yet be available in physical form for use in a product design and may provide a level of assurance that the computational platform when available will meet performance requirements.

Figure 2:
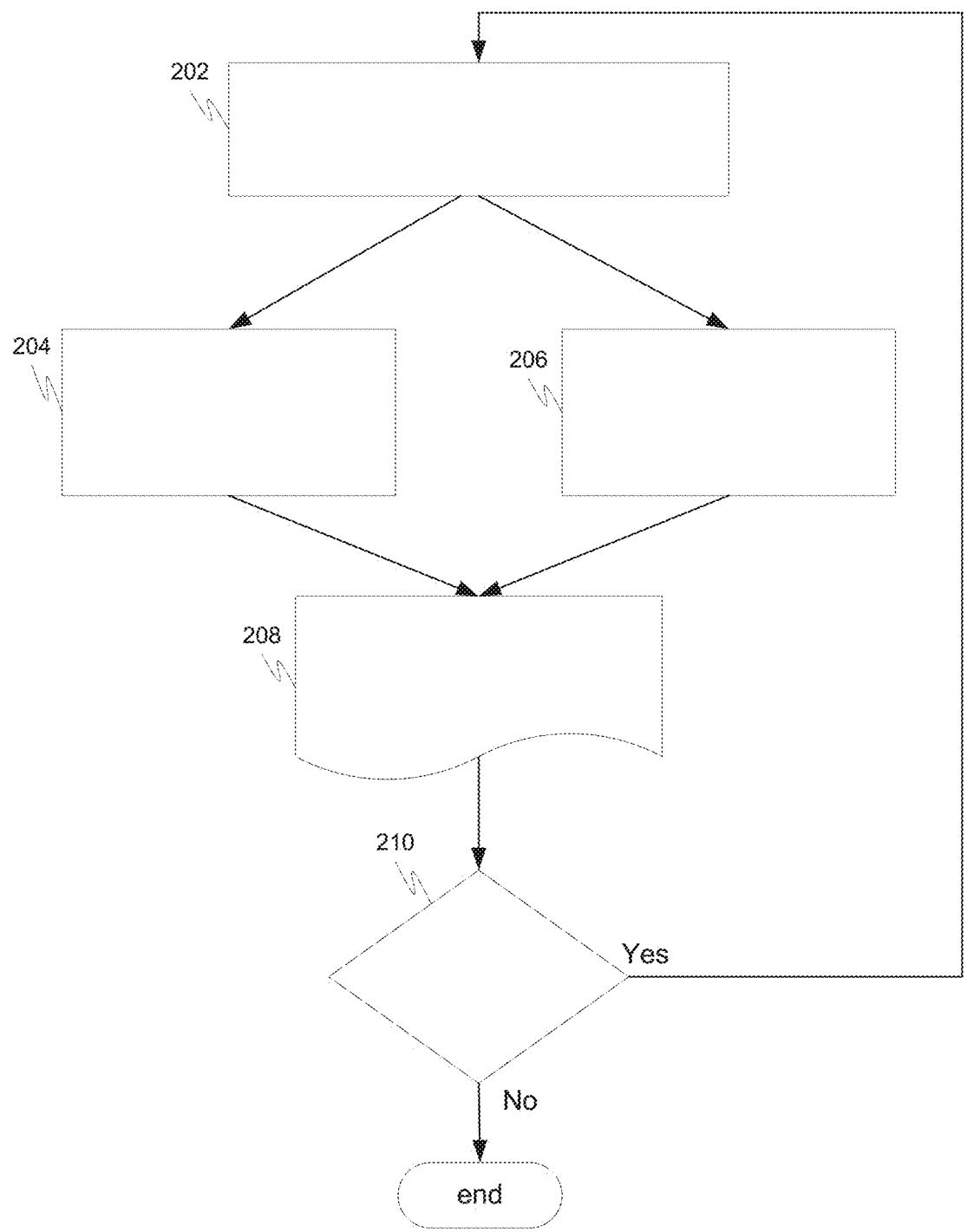
FIG. 2 is a process flow chart depicting an example process of collecting design parameters and benchmark data for a plurality of computational platforms, in accordance with some embodiments.

FIG. 2 is a process flow chart depicting an example process of collecting design parameters and benchmark data for a plurality of computational platforms and provides an example of how the "collect design parameters and benchmark data for a plurality of existing platforms" operations (operation 102 of FIG. 1) may be performed. The example process of FIG. 2 includes selecting a computational platform (operation 202). The selected computational platform should be in the same class of platforms as the new computational platform for which a prediction model is being developed although in some examples the selected computational platform may come from a different class.

For the selected computational platform, design parameters provided by the platform provider are extracted for use in training a model (operation 204). As an example, the design parameters may be extracted from the platform's data sheet.

Also, the selected computational platform's performance using benchmarking software is evaluated (operation 206). As an example, the selected computation platform may execute specific benchmarking software to generate benchmark data. The benchmark data in this example may comprise a measurement of the execution time of the computational platform in completing the execution of the specific benchmarking software or the execution time of the computational platform in completing the execution of certain portions of the specific benchmarking software. Alternatively, if benchmark data for a selected platform already exists, the pre-existing benchmark data may be used instead of evaluating the platform's performance using benchmarking software to generate new benchmark data.

The relative order in which the "extract design parameters" operations and the "evaluate platform performance using benchmarking software" operations are performed is not important. Either set of operations may be performed before the other set of operations is performed. It matters not which set of operations is performed first. Alternatively, both sets of operations may be performed in parallel.

Both the extracted design parameters and the benchmark data are recorded (operation 208). The extracted design parameters and the benchmark data can be stored in a data record in a computer storage device for later use in training a prediction model.

If data is to be collected from additional platforms (decision 210), then the operations of selecting a platform, extracting design parameters, evaluating platform performance using benchmarking software and recording the data is repeated. Otherwise, the process ends.

Figure 3:
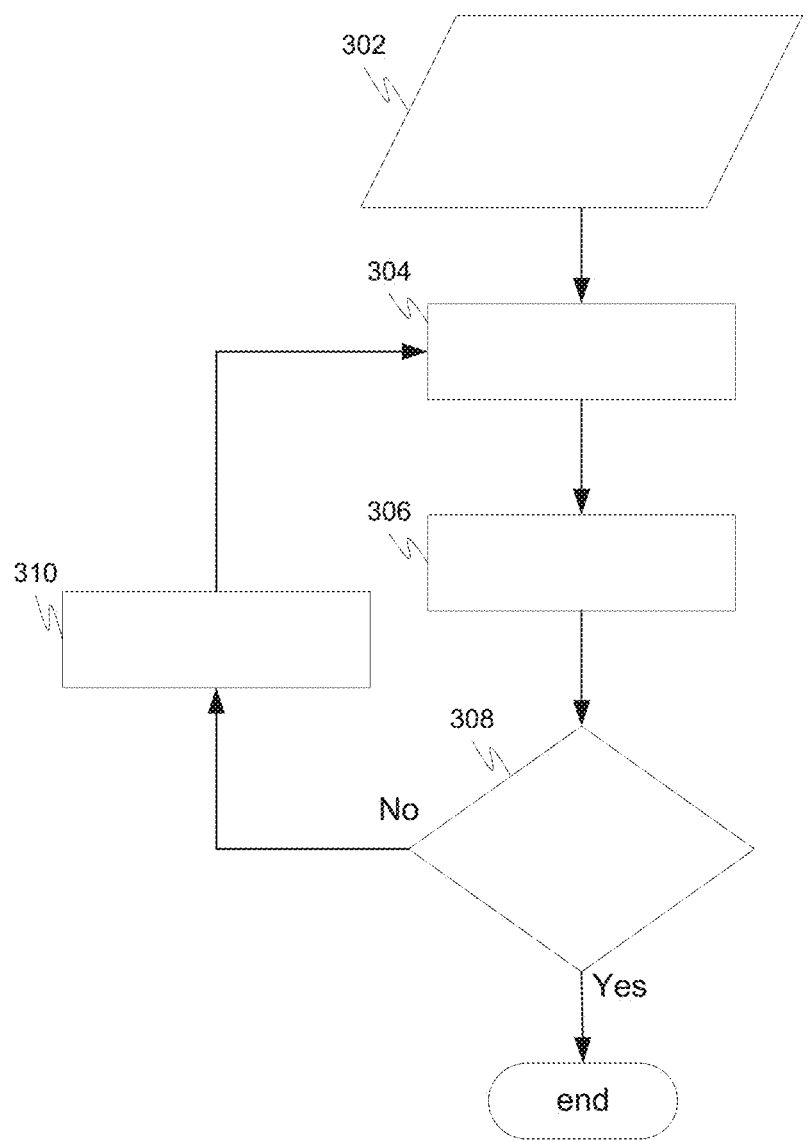
FIG. 3 is a process flow chart depicting an example process for training a model, in accordance with some embodiments.

FIG. 3 is a process flow chart depicting an example process for training a model and provides an example of how the "train and evaluate a model using collected design parameter and benchmark data" operations (operation 104 of FIG. 1) may be performed. The example process of FIG. 3 includes retrieving the platform feature data, i.e., the extracted design parameters and the measured benchmark data, for each of the computational platforms used in the training set (operation 302).

The retrieved platform feature data is used to train a mathematical model to devise a prediction model through model estimation (operation 304). The prediction model may be used to predict a computational platform's benchmark data based on design parameters.

After the prediction model is initial trained, the prediction model is tested (operation 306). The testing may involve comparing prediction data to measured data to determine the prediction accuracy.

A decision is made regarding the prediction model's accuracy (decision 308). If the prediction model meets accuracy thresholds, then the process ends. If the prediction model does not meet accuracy thresholds, then a determination is made to revise the model (operation 310) and the prediction model is adjusted to form a revised prediction model (operation 304). The cycle of model estimation (operation 304), model testing (operation 306), model revision (operation 310) is repeated until the model accuracy is acceptable (decision 308).

Figure 4:
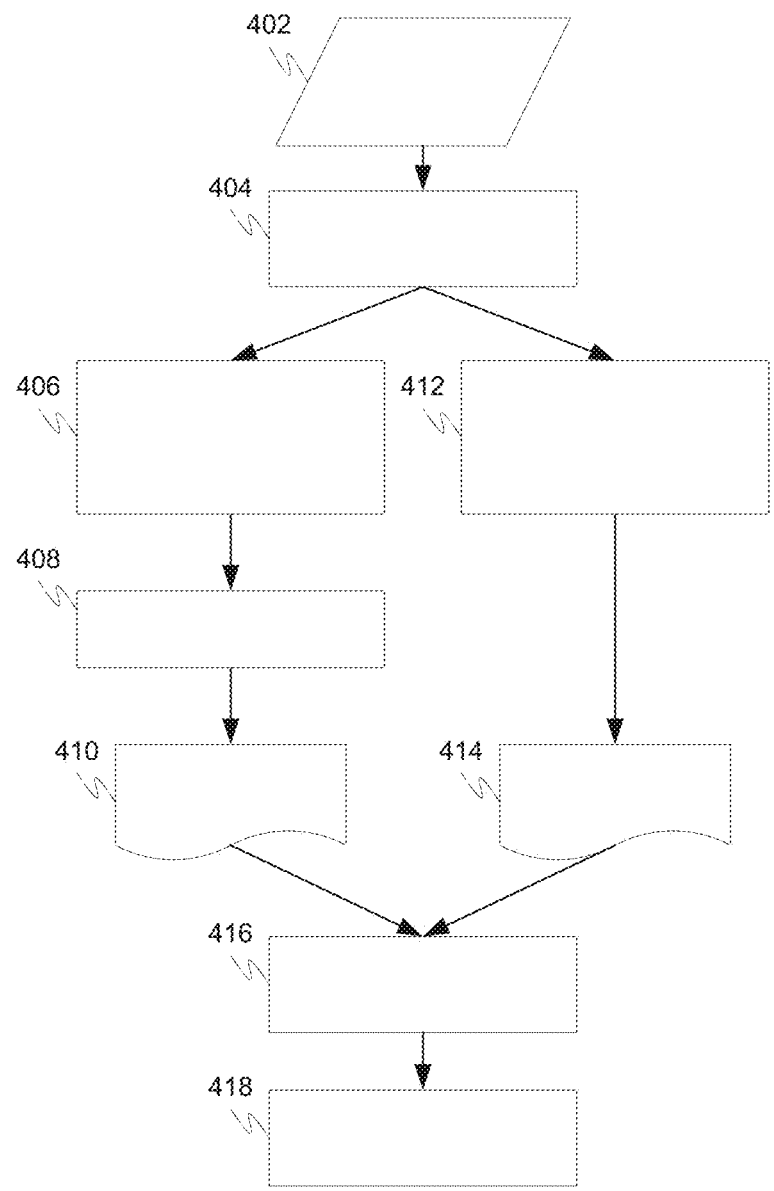
FIG. 4 is a process flow chart depicting an example process for testing a prediction model, in accordance with some embodiments.

FIG. 4 is a process flow chart depicting an example process for testing a prediction model and provides an example of how the "test model" operations (operation 306 of FIG. 3) may be performed. In the example process of FIG. 4, a set of test computational platforms are identified (operation 402). A particular test platform from the set of test computational platforms is selected (operation 404). The selected test platform should be in the same class of platforms as the set of training platforms.

For the selected test platform, design parameters provided by a platform provider are extracted for use in testing the prediction model (operation 406). As an example, the design parameters can be extracted from the platform's data sheet. The extracted design parameters are supplied to the prediction model for the prediction model to predict the test platform's benchmark performance (operation 408). The prediction model provides a prediction of what the test platform's execution time would be if it were to execute the benchmarking software used during the model training phase. The predicted benchmark performance data is recorded (operation 410).

Also, the selected test platform's performance is evaluated using the same benchmarking software used during the model training phase (operation 412). The test platform's performance may be evaluated by executing benchmarking software on the test platform. The benchmark data in this example may comprise a measurement of the execution time of the computational platform in completing the execution of the specific benchmarking software or the execution time of the computational platform in completing the execution of certain portions of the specific benchmarking software. Alternatively, if benchmark data for a selected platform already exists, the pre-existing benchmark data may be used instead of evaluating the platform's performance using benchmarking software to generate new benchmark data. The benchmark data is recorded (operation 414).

The relative order in which the "extract design parameters/predict execution time" operations and the "evaluate platform performance using benchmarking software" operations are performed is not important. Either set of operations may be performed before the other set of operations is performed. It matters not which set of operations is performed first. Alternatively, both sets of operations may be performed in parallel.

The predicted benchmark data is compared to the actual benchmark data (operation 416). The accuracy of the prediction model is determined and reported (operation 418) based on the comparison.

Figure 5:
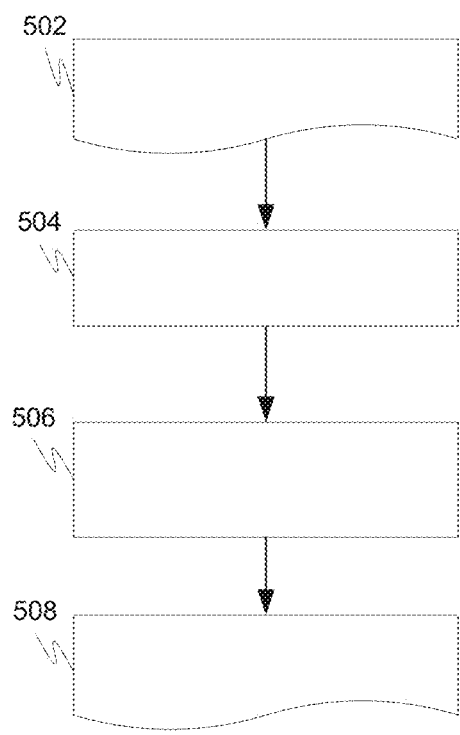
FIG. 5 is a process flow chart depicting an example process for predicting the performance of a target computational platform, in accordance with some embodiments.

FIG. 5 is a process flow chart depicting an example process for predicting the performance of a target computational platform. A target platform is selected for performance prediction (operation 502). Design parameters are extracted from platform provider information (operation 504). The prediction model, e.g., after testing and revision have been completed, is used to predict the performance of the target computational platform (operation 506). A predicted performance measurement is provided (operation 508). The predicted performance measurement may be used when selecting a computational platform for a product design.

FIG. 6 is a chart depicting example platform feature data that can be stored in a data record (e.g., in response to operation 208 of FIG. 2) and used to train a prediction model using a process such as that depicted in FIG. 2. In this example, platform feature data for three computational platforms, SoC1, SoC2, and SoC3 are shown. The design parameters recorded include the number of cores, the frequency, the L2 Cache size, and the amount of onboard memory. Also recorded are the outcome (e.g., execution time in this example) from benchmarking the SoCs or from historical data that captured execution times from previous benchmarking.

FIG. 7 is a chart depicting the use of the example platform feature data to train a prediction model using a process such as that depicted in FIGS. 3 and 4. In this example, each design parameter is associated with a distinct variable and the execution time is the output. A mathematical formula modeling the relationship between the design parameters and the execution time is determined through machine learning techniques.

FIG. 8 is a chart depicting example design parameters for a target platform that may be provided to a prediction model to predict the target platform's execution time using a process such as that illustrated in FIG. 5. This chart illustrates that a properly trained prediction model devised in accordance with the techniques described herein can be used to estimate the performance of a target platform.

FIG. 9 is a schematic block diagram of an example computer system that can be used to implement the techniques and methods described herein. The example computer system can include one or more processing system(s) 902, main memory 904, a network interface device (NID) 910, a chipset 912, a hard disk 913 and hard disk controller 915, input systems 916, and output systems 918.

The chipset 912 is usually located on a motherboard and is a set of electronic components (e.g., in an integrated circuit) that interconnects and manages the data flow between the processing system(s) 902 and other elements of the computer system and connected peripherals. For instance, the chipset 912 provides an interface between the processing system(s) 902 and the main memory 904, and also includes functionality for providing network connectivity through the NID 910, such as a gigabit Ethernet adapter. The chipset 912 typically contains the processor bus interface (also known as a front-side bus), memory controllers, bus controllers, I/O controllers, etc.

Processing system(s) 902 represents one or more general-purpose processing devices such as a microprocessor, central processing unit, or the like. More particularly, the processing system(s) 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 902 may also be one or more special-purpose processing devices such as an application specific integrated circuit (ASIC), a field programmable gate array (FPGA), a digital signal processor (DSP), network processor, or the like.

The processing system(s) 902 can include one or more central processing units (CPUs) that operate in conjunction with the chipset 912. The processing system(s) 902 perform arithmetic and logical operations necessary for the operation of the example computer system.

The NID 910 is capable of connecting the example computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 916 (or input device(s)) allow a user to input information to the computer system and can include things such as a keyboard, a mouse or other cursor pointing device, a pen, a voice input device, a touch input device, a webcam device, a microphone, etc. Output system(s) 918 (or output device(s)) present information to the user of the computer system and can include things such as a display, monitor, speakers, or the like.

The chipset 912 can provide an interface to various forms of computer-readable storage media including a main memory 904 (e.g., read-only memory (ROM), flash memory, dynamic random access memory (DRAM) such as synchronous DRAM (SDRAM)), and hard disk 913. The processing system(s) 902 can communicate with the various forms of computer-readable storage media via the chipset 912 and appropriate buses.

A hard disk 913 is a form of non-volatile memory that can store an operating system (OS) 914. The operating system 914 is software that is copied into RAM and executed by the processing system(s) 902 to control the operation of the example computer system, manage computer hardware and software resources, and provide common services for computer programs executed by the processing system(s) 902. Regardless of the implementation, the operating system 914 includes many different "components" that make the different parts of the example computer system work together. The disk controller 915 is the controller circuit which enables the processing system 902 to communicate with a hard disk 913, and provides an interface between the hard disk 913 and the bus connecting it to the rest of the system.

The main memory 904 may be composed of many different types of memory components. The main memory 904 can include non-volatile memory (such as read-only memory (ROM) 906, flash memory, etc.), volatile memory (such as random access memory (RAM) 908), or some combination of the two. The RAM 908 can be any type of suitable random access memory including the various types of dynamic random access memory (DRAM) such as SDRAM, the various types of static RAM (SRAM). The main memory 904 (as well as the processing system(s) 902) may be distributed throughout the example computer system.

The ROM 906 of the main memory 904 can be used to store firmware that includes program code containing the basic routines that help to start up the example computer system and to transfer information between elements within the example computer system. The ROM of the main memory 904 may also store other software components necessary for the operation of the example computer system.

The RAM 908 stores programs/instructions 930 or executable code for one or more programs 934 that can be loaded and executed at processing system(s) 902 to perform various functions. The programs/instructions 930 are computer readable program code that can be stored in RAM 908 (or other a non-transitory computer readable medium of the example computer system) that can be read and executed by processing system(s) 902 to perform various acts, tasks, functions, and steps as described herein. The methods and techniques described herein can be captured in programming instructions 930 for execution by the processing system 902 to cause the example computer system to perform the described methods, processes, and techniques.

Described herein are techniques based on machine learning to predict the performance of a computational platform when running a software application. The described techniques allow for the prediction of a computational platform's performance without actually implementing and running any software on the computational platform. The predictions can be made before the computational platform is available in physical form. The described techniques allow for the prediction of a computational platform's performance without using a simulator that may need a detailed modeling of the computational platform. The described techniques may use abstract information (such as specific design parameters like frequency, cache, pipeline depth, etc.) regarding the computational platform. The described techniques may provide predictions that are sufficiently accurate even when not all the design parameters are known. Additionally, the prediction accuracy may be systematically improved by iteratively adjusting the prediction model.

In one embodiment, a computer implemented method of selecting a computational platform is provided. The method comprises collecting platform feature data for each of a plurality of existing computational platforms in a particular class of computational platforms. The platform feature data for each of the plurality of existing computational platforms comprises a plurality of design parameters and a performance measurement for the computational platform to complete a benchmarking software component. The method further comprises training a mathematical model using the collected platform feature data to devise a predictive model for predicting a predicted performance measurement for a computational platform in the particular class of computational platforms when provided with design parameters, predicting, with the predictive model, the predicted performance measurement of a new computational platform that is not available for testing, and selecting a computational platform using the predicted performance measurement.

These aspects and other embodiments may include one or more of the following features. Training a mathematical model may comprises applying the collected platform feature data for a plurality of the existing computational platforms as inputs and the execution times for the plurality of the existing computational platforms as outputs to learn a general rule that maps inputs to outputs, testing the learned rule, and adjusting and retesting the rule until the model has achieved a desired accuracy goal. Testing the rule may comprise predicting a performance measurement for a test platform using the model, determining the benchmarked execution time of the test platform using the benchmarking software component, and determining the accuracy of the model by comparing the predicted test platform performance measurement with the benchmarked execution time. Predicting the predicted performance measurement of a new computational platform may comprise applying design parameters for the new computational platform as inputs to the predictive model. Predicting the predicted performance measurement of a new computational platform may comprise retraining the predictive model using a subset of the design parameters used for training the mathematical model and applying the subset of the design parameters for the new computational platform to the retrained predictive model. The design parameters may comprise design parameters that are customarily found on a platform provider datasheet. The design parameters may comprise the operating frequency, the number of cores, the number of threads, number of caches, the size of the caches, and the size of embedded memory.

In another embodiment, a system for selecting a computational platform is provided. The system comprises one or more processors and non-transient computer readable media. The non-transient computer readable media is encoded with programming instructions that when executed by the one or more processors cause the system to collect platform feature data for each of a plurality of existing computational platforms in a particular class of computing models. The platform feature data for each of the plurality of existing computational platforms comprises a plurality of design parameters and a performance measurement for the computational platform when running a benchmarking software component. The non-transient computer readable media is further encoded with programming instructions that when executed by the one or more processors cause the system to train a mathematical model using the collected platform feature data to devise a predictive model for predicting a predicted performance measurement of a computational platform in the particular class of computing models when provided with design parameters and predict, with the predictive model, the predicted performance measurement of a new computational platform that is not available for testing.

These aspects and other embodiments may include one or more of the following features. The instructions that cause the system to train a mathematical model may comprise instructions that cause the system to learn a rule that maps the inputs to a desired output by applying the collected platform feature data for a plurality of the existing computational platforms as inputs and the execution times for the plurality of the existing computational platforms as outputs to learn a general rule that maps inputs to outputs, test the learned rule, and adjust and retest the rule until the model has achieved a desired accuracy goal. The instructions that cause the system to test the rule may comprise instructions that cause the system to predict a predicted performance measurement for a test platform using the model, determine the benchmarked execution time of the test platform using the benchmarking software component, and determine the accuracy of the model by comparing the predicted test platform performance measurement with the benchmarked execution time. The instructions that cause the system to predict the predicted performance measurement of a new computational platform may comprise instructions that cause the system to apply design parameters for the new computational platform as inputs to the predictive model. The design parameters may comprise design parameters that are customarily found on a platform provider datasheet. The design parameters may comprise the operating frequency, the number of cores, the number of threads, number of caches, the size of the caches, and the size of embedded memory. The computational platform may comprise a system on a chip (SOC), a central processing unit (CPU), a graphical processing unit (GPU), or a digital signal processor (DSP).

In another embodiment, a non-transitory computer readable storage medium embodying programming instruction for performing a method is provided. The method comprises collecting platform feature data for each of a plurality of existing computational platforms in a particular class of computing models. The platform feature data for each of the plurality of existing computational platforms comprises a plurality of design parameters and a performance measurement for the computational platform when running a benchmarking software component. The method further comprises training a mathematical model using the collected platform feature data to devise a predictive model for predicting a predicted performance measurement of a computational platform in the particular class of computing models when provided with design parameters that are customarily found on a platform provider datasheet and predicting, with the predictive model, the predicted performance measurement of a new computational platform that is not available for testing.

These aspects and other embodiments may include one or more of the following features. Training a mathematical model may comprise learning a rule that maps the inputs to a desired output by applying the collected platform feature data for a plurality of the existing computational platforms as inputs and the execution times for the plurality of the existing computational platforms as outputs to learn a general rule that maps inputs to outputs, testing the learned rule, and adjusting and retesting the rule until the model has achieved a desired accuracy goal. Testing the rule may comprise predicting a performance measurement for a test platform using the model, determining the benchmarked execution time of the test platform using the benchmarking software component, and determining the accuracy of the model by comparing the predicted test platform performance measurement with the benchmarked execution time. Predicting the predicted performance measurement of a new computational platform may comprise applying design parameters for the new computational platform as inputs to the predictive model. Predicting the performance measurement of a new computational platform may comprise retraining the predictive model using a subset of the design parameters used for training the mathematical model and applying the subset of the design parameters for the new computational platform to the retrained predictive model. The design parameters may comprise the operating frequency, the number of cores, the number of threads, number of caches, the size of the caches, and the size of embedded memory.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer implemented method of selecting a computational platform, the method comprising:
    collecting platform feature data comprising a plurality of design parameters for each of a plurality of distinct existing computational platforms in a particular class of computational platforms and a performance measurement for each of the plurality of distinct existing computational platforms to complete a benchmarking software component;
    training a mathematical model using the collected platform feature data for the plurality of distinct existing computational platforms, to devise a predictive model that is configured to predict, based on design parameters for a different computational platform in the particular class of computational platforms, a predicted performance measurement for the different computational platform when provided with design parameters for the different computational platform;
    predicting, with the predictive model, a performance measurement for a new computational platform that is not available for testing based on design parameters for the new computational platform; and
    selecting the new computational platform using the predicted performance measurement.

2. The method of claim 1, wherein training a mathematical model comprises:
    applying the collected platform feature data for a plurality of the existing computational platforms as inputs and execution times for the plurality of existing computational platforms as outputs to learn a general rule that maps inputs to outputs;
    testing the learned general rule; and
    adjusting and retesting the general rule until the model has achieved a desired accuracy goal.

3. The method of claim 2, wherein testing the general rule comprises:
    predicting a performance measurement for a test platform using the model;
    determining a benchmarked execution time of the test platform using the benchmarking software component; and
    determining the accuracy of the model by comparing the predicted test platform performance measurement with the benchmarked execution time.

4. The method of claim 1 wherein predicting the predicted performance measurement of a new computational platform comprises applying the design parameters for the new computational platform as inputs to the predictive model.

5. The method of claim 4 wherein predicting the predicted performance measurement of a new computational platform comprises retraining the predictive model using a subset of the design parameters used for training the mathematical model and applying the subset of the design parameters for the new computational platform to the retrained predictive model.

6. The method of claim 1 wherein the design parameters comprise design parameters that are customarily found on a platform provider datasheet.

7. The method of claim 1 wherein the design parameters comprise an operating frequency, a number of cores, a number of threads, a number of caches, a size of the caches, and a size of embedded memory.

8. A system for selecting a computational platform, comprising:
    one or more processors; and
    non-transitory computer readable media encoded with programming instructions that when executed by the one or more processors cause the system to:
        collect platform feature data comprising a plurality of design parameters for each of a plurality of distinct existing computational platforms in a particular class of computational platforms and a performance measurement for each of the plurality of distinct existing computational platforms to complete a benchmarking software component;
        train a mathematical model using the collected platform feature data for the plurality of distinct existing computational platforms, to devise a predictive model that is configured to predict, based on design parameters for a different computational platform in the particular class of computational platforms, a predicted performance measurement for the different computational platform when provided with the design parameters for the different computational platform; and
        predict, with the predictive model, a performance measurement for a new computational platform that is not available for testing based on design parameters for the new computational platform.

9. The system of claim 8 wherein the instructions that cause the system to train a mathematical model comprise instructions that cause the system to:
    learn a general rule that maps the inputs to a desired output by applying the collected platform feature data for a plurality of the existing computational platforms as inputs and execution times for the plurality of the existing computational platforms as outputs to learn the general rule that maps inputs to outputs;

test the learned general rule; and adjust and retest the general rule until the model has achieved a desired accuracy goal.

10. The system of claim 9, wherein the instructions that cause the system to test the general rule comprise instructions that cause the system to:

predict a performance measurement for a test platform using the model;

determine the benchmarked execution time of the test platform using the benchmarking software component; and determine the accuracy of the model by comparing the predicted test platform performance measurement with the benchmarked execution time.

11. The system of claim 8 wherein the instructions that cause the system to predict the predicted performance measurement of a new computational platform comprise instructions that cause the system to apply the design parameters for the new computational platform as inputs to the predictive model.

12. The system of claim 8 wherein the design parameters comprise design parameters that are customarily found on a platform provider datasheet.

13. The system of claim 8 wherein the design parameters comprise an operating frequency, a number of cores, a number of threads, a number of caches, a size of the caches, and a size of embedded memory.

14. The system of claim 8 wherein the computational platform comprises a system on a chip (SOC), a central processing unit (CPU), a graphical processing unit (GPU), or a digital signal processor (DSP).

15. A non-transitory computer readable storage medium embodying programming instructions for performing a method, the method comprising:

collecting platform feature data comprising a plurality of design parameters for each of a plurality of distinct existing computational platforms in a particular class of computational platforms and a performance measurement for each of the plurality of distinct existing computational platforms to complete a benchmarking software component;

training a mathematical model, using the collected platform feature data for the plurality of distinct existing computational platforms, to devise a predictive model that is configured to predict, based on design parameters for a different computational platform in the particular class of computational platforms, a predicted performance measurement for the different computational platform when provided with the design parameters for the different computational platform; and predicting, with the predictive model, a performance measurement for a new computational platform that is not available for testing based on design parameters for the new computational platform.

16. The non-transitory computer readable storage medium of claim 15, wherein training a mathematical model comprises:

learning a general rule that maps the inputs to a desired output by applying the collected platform feature data for a plurality of the existing computational platforms as inputs and execution times for the plurality of the existing computational platforms as outputs to learn the general rule that maps inputs to outputs;

testing the learned general rule; and adjusting and retesting the general rule until the model has achieved a desired accuracy goal.

17. The non-transitory computer readable storage medium of claim 16, wherein testing the general rule comprises:

predicting a performance measurement for a test platform using the model;

determining the benchmarked execution time of the test platform using the benchmarking software component; and determining the accuracy of the model by comparing the predicted test platform performance measurement with the benchmarked execution time.

18. The non-transitory computer readable storage medium of claim 15 wherein predicting the predicted performance measurement of a new computational platform comprises applying the design parameters for the new computational platform as inputs to the predictive model.

19. The non-transitory computer readable storage medium of claim 18 wherein predicting the predicted performance measurement of a new computational platform comprises retraining the predictive model using a subset of the design parameters used for training the mathematical model and applying the subset of the design parameters for the new computational platform to the retrained predictive model.

20. The non-transitory computer readable storage medium of claim 15 wherein the design parameters comprise an operating frequency, a number of cores, a number of threads, a number of caches, a size of the caches, and a size of embedded memory.

* * * * *